United States Patent [19]
Bullivant

[11] Patent Number: 5,000,275
[45] Date of Patent: Mar. 19, 1991

[54] LOW POWER CONSUMPTION CONTROLLER FOR WEIGHT SENSING ARTICLE INPUT AND REMOVAL MONITORING SYSTEM

[75] Inventor: Kenneth W. Bullivant, Chadds Ford, Pa.

[73] Assignee: K-Tron International, Inc., Pitman, N.J.

[21] Appl. No.: 487,290

[22] Filed: Mar. 2, 1990

[51] Int. Cl.$^5$ .................. G01G 3/14; G01G 19/52
[52] U.S. Cl. ............................. 177/210 R; 177/50
[58] Field of Search ..................... 177/50, 58, 132

[56] References Cited

U.S. PATENT DOCUMENTS

4,696,359  9/1987  Glibbery ........................... 177/211
4,909,340  3/1990  Kazais et al. ..................... 177/211

Primary Examiner—George H. Miller, Jr.
Attorney, Agent, or Firm—Oliff & Berridge

[57] ABSTRACT

A low power consumption controller for weight based article input and removal monitoring apparatus comprises a continuously active weight monitoring section responsive to the weight sensor output(s) for producing a first control signal in response to predetermined changes in the sensed weight; and a signal analysis section switchable from an inactive mode to an active mode in response to the first control signal for analyzing the sensor output(s), and for controlling the operation of the weight monitoring section. The weight monitoring section comprises: timing circuitry for generating first and second timing signals in a predetermined timed relation to each other independent of control by the signal analysis section and a third timing signal in predetermined timed relation to the first and second timing signals under the control of the signal analysis section; a switch responsive to the first timing signal for controlling connection of a sensor power supply to the sensor(s) to provide intermittent operation of the sensor(s); signal sensing circuitry responsive to the second and third timing signals for producing successive weight sample signals from the sensor output; signal comparing circuitry responsive to the weight sample signals and to a threshold signal produced by the signal analysis section for producing the first control signal.

8 Claims, 6 Drawing Sheets

LOW POWER CONSUMPTION CONTROLLER FOR WEIGHT SENSING ARTICLE INPUT AND REMOVAL MONITORING SYSTEM

FIELD OF THE INVENTION

The present invention relates generally to weight sensing article input and removal monitoring systems, and more particularly to low power consumption controllers therefor.

BACKGROUND OF THE INVENTION

Applicant is a coinventor of a weight-based article theft detection system and product display rack which is disclosed in U.S. Pat. No. 4,819,015, and assigned to the assignee of the present invention. In its original form, the invention of the '015 Patent has been embodied in a large-scale display rack for cartons of cigarettes. Applicant has also developed low-profile weight sensors and a self-calibrating control system which are particularly suited for implementation in small-scale anti-theft product racks, such as counter top displays used in retail stores, as well as other small-scale article storage systems in which it is desired to monitor input and removal of articles from the storage system. These sensors and the self-calibrating control system are disclosed in applicant's copending application, Ser. No. 07/467,516, filed Jan. 18, 1990. In large-scale applications, the control system typically can be supplied power from existing A.C. electrical outlets, or can otherwise be connected into the existing electrical distribution system without undue inconvenience or expense. However, in the case of small-scale applications, such as countertop displays, for example, it is impractical or unacceptable to the owner of the display to have power lines running from the location of the display to the electrical distribution system provided in the display owner's premises.

The control system for small-scale applications is thus advantageously powered by a self-contained power source. Further, in order to be commercially practical, both the antitheft system and its power supply must be as inexpensive as possible, and the power supply should require only minimal maintenance. These requirements make a low voltage, low power consumption, battery powered control system advantageous. However, because the weight measurements on which applicant's theft detection system is based advantageously should be high resolution and noise free measurements, the choices of suitable weight sensors and signal processing circuitry which also satisfy the low power consumption requirements for a practical system are constrained.

SUMMARY OF THE INVENTION

Accordingly, it is a principal object of the present invention to provide a low cost, low power consumption controller for a weight-based article input and removal monitoring system which permits high resolution low voltage weight measurements to be made and analyzed in accordance with the theft detection algorithms patented in the '015 Patent.

This and other objects are achieved in accordance with the present invention by a controller comprising a continuously active weight monitoring section responsive to the weight sensor output(s) for producing a first control signal in response to predetermined changes in the sensed weight; and a signal analysis section switchable from an inactive mode to an active mode in response to the first control signal for analyzing the sensor output(s), and for controlling the operation of the weight monitoring section. The weight monitoring section comprises: timing circuitry for generating first and second timing signals in a predetermined timed relation to each other independent of control by the signal analysis section and a third timing signal in predetermined timed relation to the first and second timing signals under the control of the signal analysis section; a switch responsive to the first timing signal for controlling connection of a sensor power supply to the sensor(s) to provide intermittent operation of the sensor(s); signal sensing circuitry responsive to the second and third timing signals for producing successive weight sample signals from the sensor output; signal comparing circuitry responsive to the weight sample signals and to a threshold signal produced by the signal analysis section for producing the first control signal.

These and other features and advantages of the present invention are disclosed in or apparent from the following detailed description of a preferred embodiment.

BRIEF DESCRIPTION OF THE DRAWINGS

The preferred controller embodiment will be described with reference to the accompanying drawings, in which like elements are denoted with like reference numerals throughout the figures, and in which.

DETAILED DESCRIPTION OF THE PREFERRED EMBODIMENT

Figure 1:
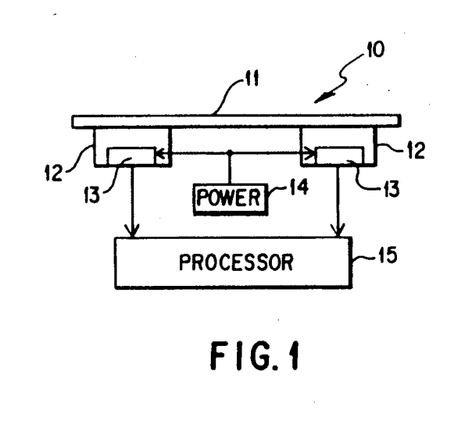
FIG. 1 is a general block diagram of a theft detection system for which the controller of the present invention is particularly suited.

A weight based article input and removal monitoring or theft detection system for which the low power controller of the present invention is particularly suited is shown diagrammatically in FIG. 1. The theft detection system, generally denoted 10, comprises an article supporting rack or platform 11 supported by a plurality of weight sensors 12. Sensors 12 advantageously include transducers comprising a magnetic field sensor 13, such as a Honeywell 8SSAE1 Hall effect sensor, which produce output signals proportional to the load on the platform 11. Sensors 13 are powered from a source 14. The sensor 12 output signals are analyzed by a processor 15 according to theft detection algorithms as set forth more fully in the aforesaid copending application Ser. No. 07/467,516, filed Jan. 18, 1990, which application is hereby incorporated herein by reference. As part of the analysis, the weight signals are compared with predetermined thresholds which are established pursuant to the self-testing calibration method of the aforesaid copending application incorporated herein by reference.

Figure 2:
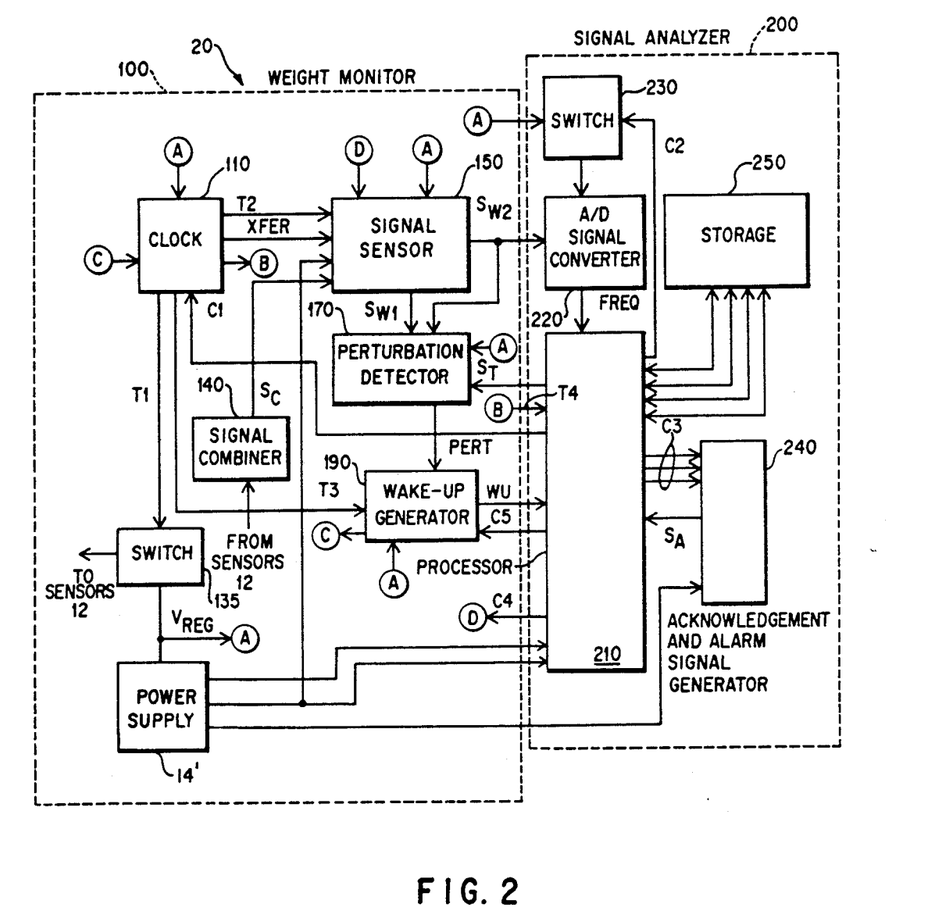
FIG. 2 is a block diagram of the preferred embodiment of a controller in accordance with the present invention.

Referring to FIG. 2, in accordance with the present invention, a low power consumption controller 20 for implementing theft detection system 10 comprises a continuously active weight monitoring section 100 and a theft detection analysis section 200 which switches from a very low power shut down mode to an active mode in response to a control signal from monitoring section 100, as described in more detail hereinafter. Monitoring section 100 comprises a clock 110 for generating timing signals T1, T2, T3 and T4, as well as a further timing signal XFER under the control of a control signal PERT generated by weight monitoring section 100 and a control signal C1 generated by analysis section 200; a switch 135 responsive to timing signal T1 from clock 110 for controlling the connection of a power supply 14' to sensors 12; a signal combiner 140 for combining the outputs of sensors 12 to produce a composite sensor output signal $S_c$; a signal sensor 150 responsive to timing signals T2 and XFER from clock 110 for producing successive pairs of weight sample signals $S_{w1}$ and $S_{w2}$ from sensor output signal $S_c$; a perturbation detector 170 responsive to a threshold signal $S_T$ supplied by analysis section 200 for producing a control signal PERT in response to predetermined changes in signal $S_c$ based on the weight sample signals $S_{w1}$ and $S_{w2}$ produced by signal sensor 150; and a wake-up signal generator 190 responsive to control signal PERT and a timing signal T3 from clock 110 for producing a control signal WU for switching analysis section 200 from its shut down to its active mode.

Analysis section 200 comprises a conventional microprocessor (MPU) 210, such as a Signetics 87C751 processor, having an internal counter 211, RAM 212, and clock circuit 213 (see FIG. 4B), and at least one and preferably two reduced power modes which can be entered under software control. One reduced power mode is an idle mode, in which program execution halts but internal counter 211 and interrupt inputs continues to function. An enabled interrupt causes program execution to resume. A second reduced power mode is preferably a power down mode, in which clock 213 halts but the contents of RAM 212 are saved. The only way to wake up MPU 210 from the power down mode is via a hardware reset signal. Upon entering the power down mode, the then current state of all the output ports is maintained, but upon hardware reset to exit the power down mode, all output ports are set to their high state. The ports of MPU 210 advantageously are individually software configurable as inputs or outputs, and the same port can function as an input or an output port at different times, so that different peripheral components can interface with MPU 210 over the same port lines. As shown, clock circuit 213 is completed by a resonator 214 and capacitors 215 and 216 as is conventional. MPU 210 corresponds to processor 15 of FIG. 1, and is thus programmed to perform the self-calibration and theft detection routines described in applicant's aforementioned copending application Ser. No. 07/467,516 which is incorporated herein by reference. MPU 210 is also programmed to generate, following wake up reset in response to control signal WU, the control signal C1 and other control signals to be described hereinafter for controlling operation of weight monitoring section 100. Operation of MPU 210 is synchronized with the operation of monitoring system 100 by timing signal T4 generated by clock 110.

Analysis section 200 further comprises an analog to digital converter (ADC) 220 for converting a predetermined one of the analog weight signal samples produced by signal sensor 150 into digital signals FREQ for input into MPU 210 in response to a control signal C2 produced by MPU 210. As shown, control signal C2 advantageously controls a switch 230 connecting ADC 220 to power supply 14'. It will be appreciated that the signals FREQ are converted to digital weight data for processing by MPU 210 by cyclically incrementing MPU counter 212 with the signal FREQ for time periods determined by timing signal T4. Upon the occurrence of each timing signal T4, the contents of counter 212 are transferred to MPU RAM 212 for further processing, and counter 211 is reset.

Also included in analysis section 200 is an acknowledgement and alarm signal generator 240 responsive to control signals C3 produced by MPU 210 for producing predetermined signals indicative of authorized and unauthorized removal of product units from the product display as determined by MPU 210 and other signals used to inform the operator regarding the operation of controller 20.

A non-volatile storage device 250 connected to MPU 210 is also provided for storing perturbation threshold, weight signal gain and alarm criteria data obtained during the calibration mode. Advantageously, storage device 250 is also connectable to an external device such as a personal computer (not shown) for input and storage of selected software options associated with the operation of MPU 210 and the theft detection and calibration programs stored therein. A National Semiconductor 256-bit Type 93C06 or 1024-bit 93C46 EEPROM advantageously constitutes storage device 250.

Figure 4A:
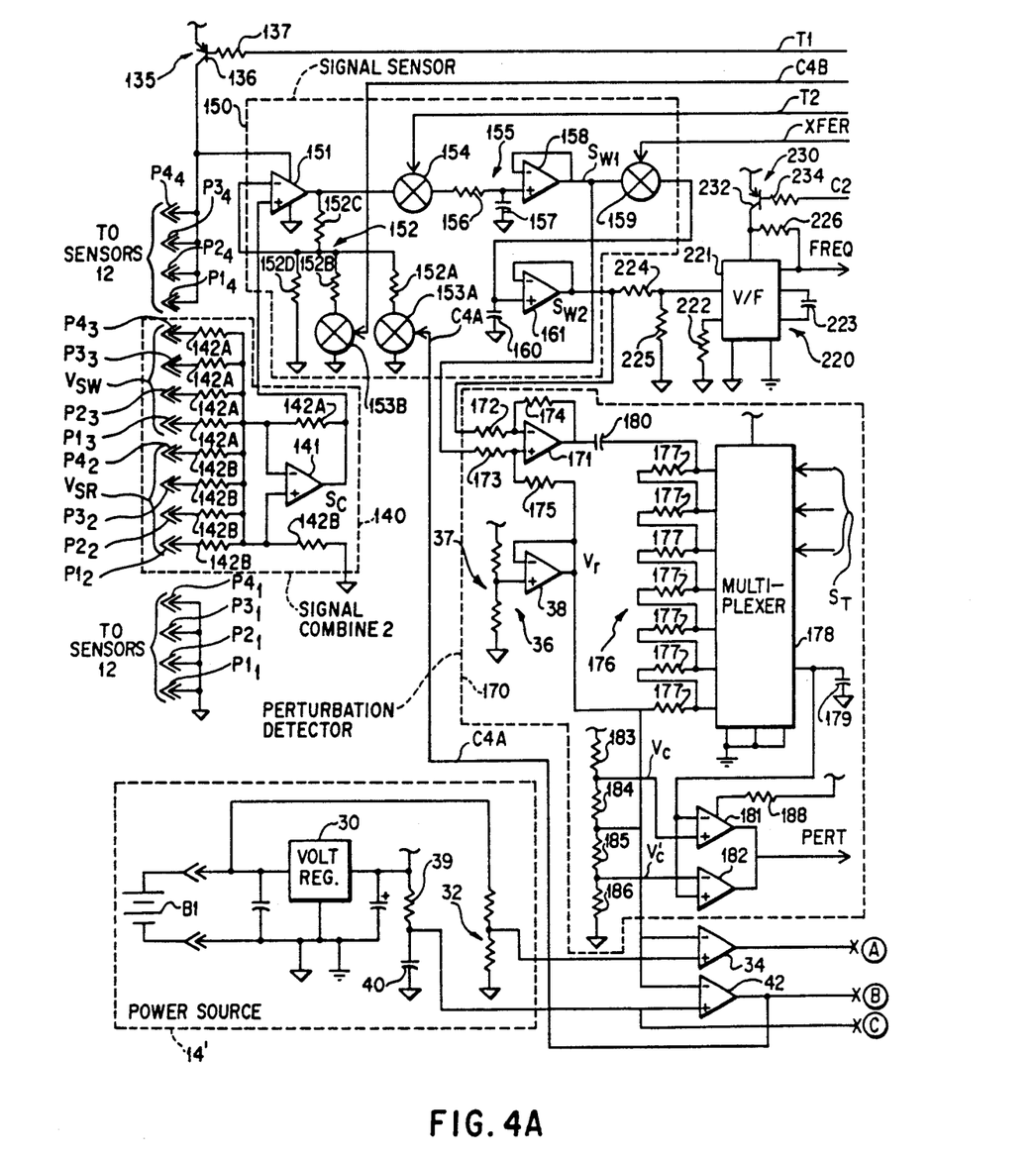
FIGS. 4A–4C are a schematic circuit diagram of the controller shown in FIG. 2.
Figure 4B:
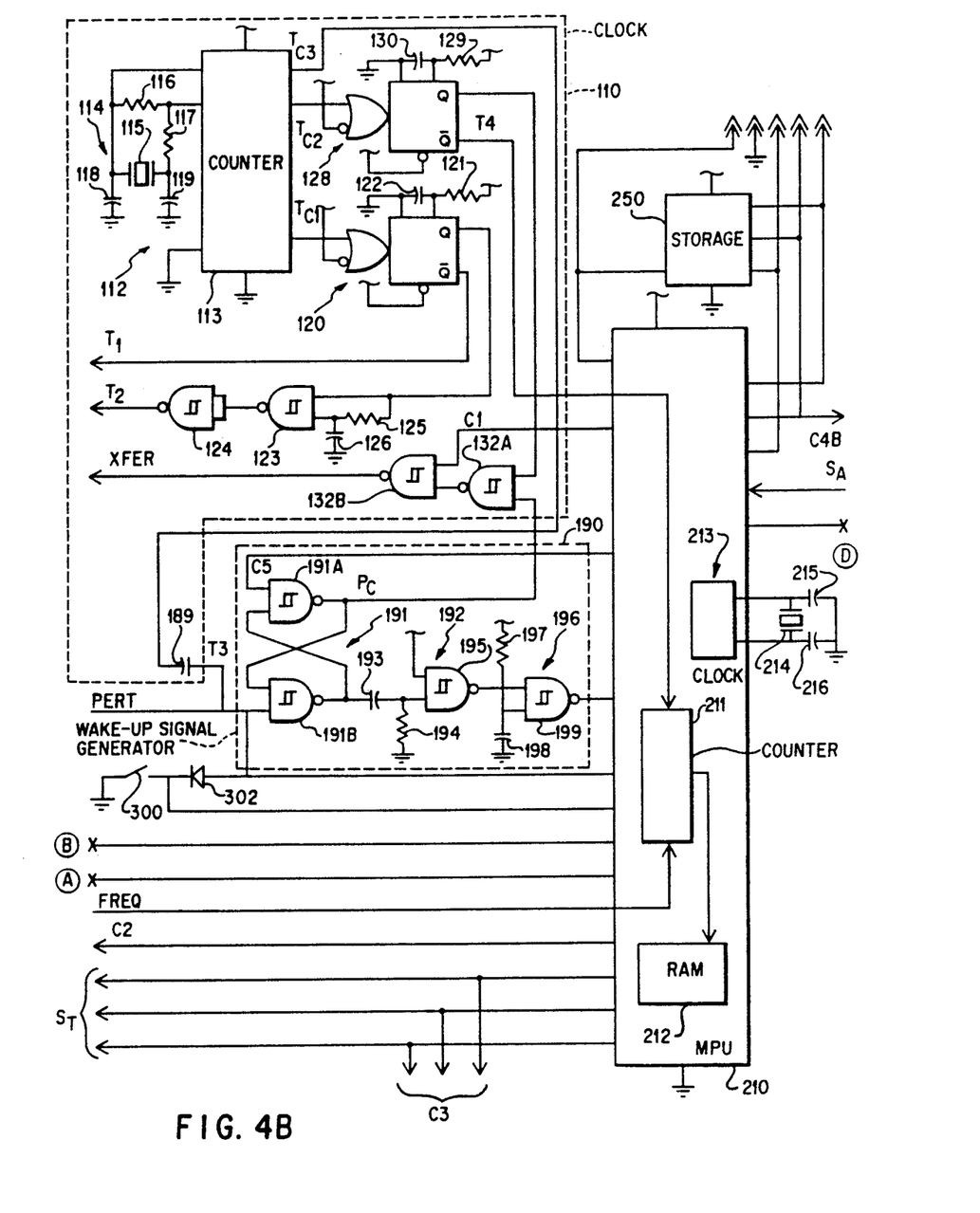
Figure 4C:
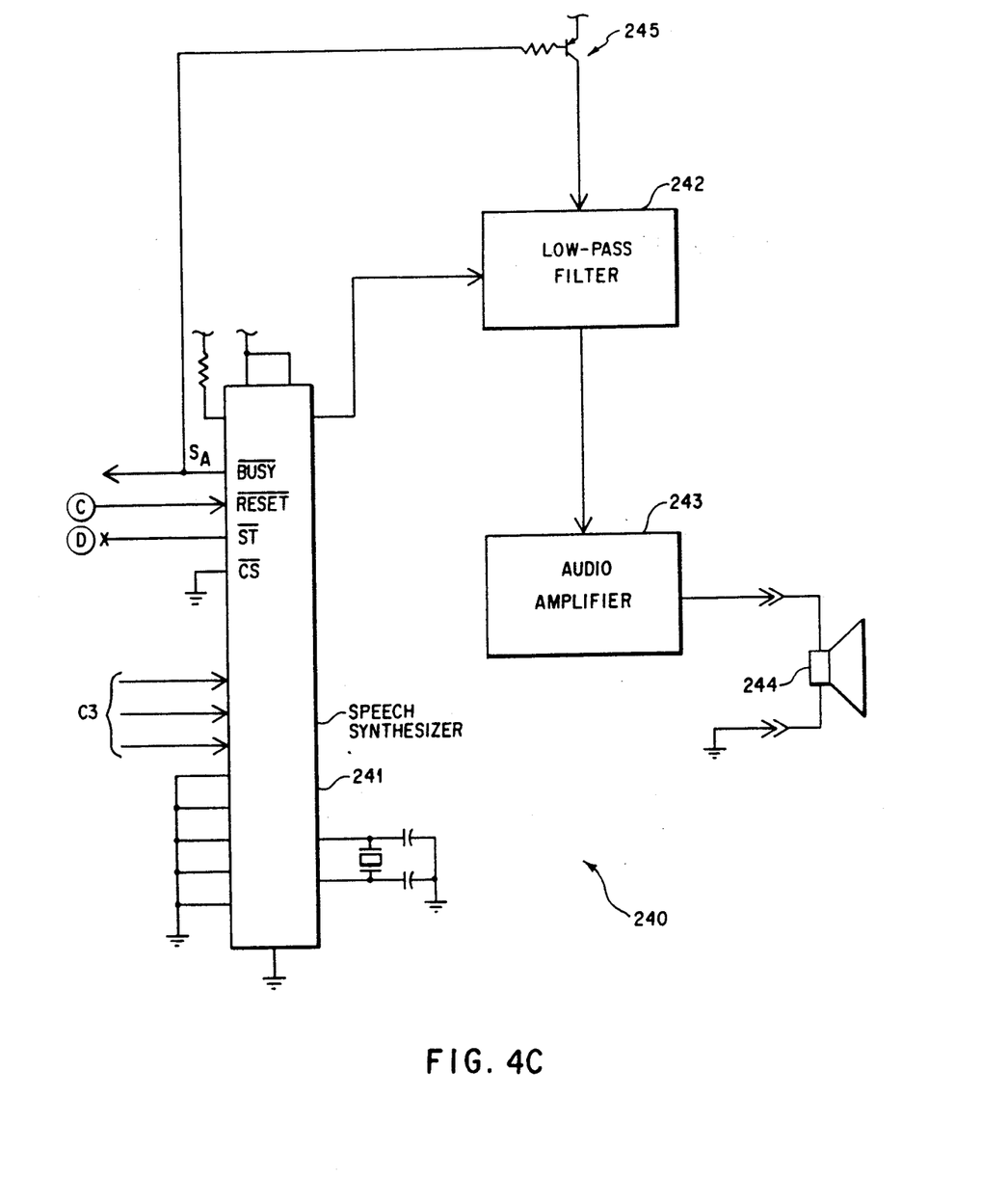

Referring to FIGS. 4A–4C, power supply 14' advantageously comprises a conventional 9 volt alkaline battery B1 located remote from controller 20. The output of battery B1 is regulated to a predetermined voltage $V_{REG}$, e.g., 5 volts, by a voltage regulator 30 such as a National Semiconductor Type LM 2936. The state of battery B1 is monitored by connecting the battery output across a resistive voltage divider 32, the output of which is connected to one input of a comparator 34. The other input of comparator 34 is connected to a pseudo-ground reference voltage $V_r$ produced by a pseudo-ground generator 36 comprising a further resistive voltage divider 37 connected to the regulated voltage $V_{REG}$ and a buffer amplifier 38 connected to the output of divider 37. Advantageously, with regulated voltage $V_{REG}=5$ volts, voltage divider 32 produces a voltage equal to 0.295 of the voltage of battery B1, and pseudo-ground voltage $V_r$ is equal to 1.6 volts, so that the output of comparator 34 switches from high to low when the battery B1 voltage falls below 5.4 volts. The output of comparator 34 is connected to MPU 210, which is programmed to generate a control signal C3 in response to a low comparator output for actuating acknowledgement and alarm signal generator 240 to indicate a low battery condition.

The regulated voltage $V_{REG}$ is connected via a resistor 39 to charge a capacitor 40. The voltage on capacitor 40 is connected to one input of a comparator 42 having its second input connected to pseudo-ground reference voltage $V_r$, so that the output of comparator 42 will switch from low to high a predetermined time, e.g., approximately 10 msec., following connection of battery B1. The output of comparator 42 is connected as a control input to MPU 210. Advantageously, a comparator with "open collector" outputs constitutes comparators 34 and 42, such that the high and low states of the comparator outputs correspond, respectively, to open-circuit and short-circuit (grounded) conditions of the output, with no actual signals appearing at the outputs. Thus, the ports of MPU 210 to which the outputs of comparators 34 and 42 are connected can be programmed as output ports during those times when the comparator outputs are high (open).

Clock 110 advantageously comprises a time base generator 112 formed by a Type 4060 14-stage binary counter 113 and oscillator circuit 114 comprising a 32,768 Hz crystal 115, resistors 116 and 117 and capacitors 118 and 119. Time base generator 112 generates three square wave clock signals $T_{c1}$, $T_{c2}$, $T_{c3}$ having frequencies of 64, 4 and 2 Hz, respectively. Timing signal T1 is generated by a one-shot multivibrator 120 producing complementary $\overline{Q}$ and outputs in response to clock signal $T_{c1}$ connected to the positive going trigger input. The values of resistor 121 and capacitor 122 are selected so that the multivibrator outputs have a 100 $\mu$sec pulse width. The negative going ($\overline{Q}$) output is used as signal T1. Timing signal T2 is generated by connecting the positive going (Q) output of multivibrator 120 to a delay network comprising a Schmitt NAND gate 123 and an inverting NAND gate 124. The Q output of multivibrator 120 is connected directly to one input of gate 123 and via a lag network comprising resistor 125 and capacitor 126 to the other input of gate 123. The values of resistor 125 and capacitor 126 are selected so that the leading edge of the timing signal T2 pulses is delayed a predetermined time period, e.g., approximately 15 $\mu$sec., relative to the leading edge of the timing signal T1 pulses.

Clock signal $T_{c3}$ advantageously is used to generate timing signal T3 as described hereinbelow. Timing signal T4 is generated by a one shot multivibrator 128 producing complementary Q and $\overline{Q}$ outputs in response to clock signal $T_{c3}$ connected to the positive going trigger input. The values of resistor 129 and capacitor 130 are selected so that the multivibrator 128 outputs have a 6 msec. pulse width. The negative going output of $\overline{Q}$ of multivibrator 128 is used as timing signal T4, which is connected to a port of MPU 210 program configured as the highest priority interrupt input. As noted hereinabove, the occurrence of timing signal T4 causes the contents of MPU counter 211 to be saved in RAM 212 and the counter to be reset to zero when MPU 210 is not in the power down mode.

Control signal XFER is generated by connecting the positive going output Q of multivibrator 128 to one input of the first gate 132A of a two stage NAND gate network 132. The other input to gate 132A is connected to a control signal Pc generated by wake-up generator 190 as described in more detail hereinbelow, with the result that the output of gate 132A will be a negative going pulse corresponding to the Q output of multivibrator 128 so long as control signal Pc is in a high state. The output of gate 132A is connected to one input of gate 132B of gate network 132, and control signal C1 from MPU 210 is connected to the other input of gate 132B. Consequently, the XFER output of gate 132B is a series of positive going timing pulses which can be inhibited by control signal Pc being low, and which can be overridden by control signal C1 to provide a continuously high state output signal.

Switch 135 advantageously comprises a transistor switch 136 connected between voltage $V_{REG}$ and the sensors 12 via connectors $P1_4$-$P4_4$. Timing signal T1 is connected to the base of transistor 136 via a biasing resistor 137, with the result that sensors 12 are operated in a pulsed mode wherein the sensors are energized 64 times a second for 100 $\mu$sec intervals.

Figure 3:
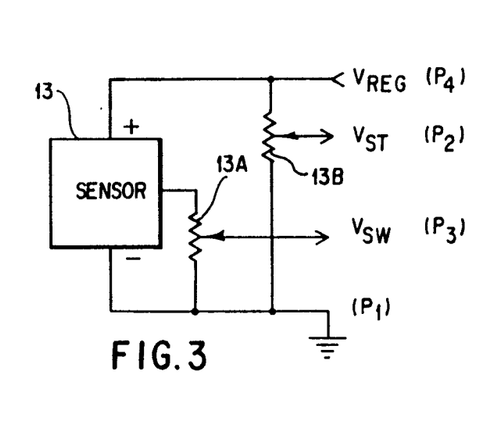
FIG. 3 is a circuit diagram of a weight sensor adapted for use with the controller of FIG. 2.

Referring to FIG. 3, each sensor 12 advantageously includes an associated bridge circuit comprising an output potentiometer 13A connected to the output of sensor 13 for producing, as a first sensor output, a trimmed weight signal $V_{sw}$ indicative of the load on the sensor; and a reference potentiometer 13B connected across the power source 14 (between source voltage $V_{REG}$ and ground in FIG. 3), which is adjusted to produce as a second output a reference voltage $V_{sr}$ corresponding to the trimmed weight signal when the sensor is unloaded. Referring again to FIGS. 4A-4C, signal combiner 140 comprises a unity gain differential summing amplifier 141 and two resistive voltage divider networks 142A and 142B for respectively combining the outputs $V_{sw}$ and $V_{sr}$ of the individual sensors 12 and for applying voltages proportional to the respective combined sensor outputs to the respective inputs of amplifier 141, as shown. The output of amplifier 141 constitutes signal $S_c$. Because signal $S_c$ is zero-based, variable gain amplification of weight signals derived from signal S for subsequent processing is made possible.

Signal sensor 150 comprises a noninverting amplifier 151 connected to the output $S_c$ of amplifier 141 and having a controllable gain responsive to control signals C4 from MPU 210. More specifically, a resistive voltage divider network 152 is connected as shown to amplifier 151, and has two resistors 152A and 152B respectively connected to ground via electronic switches or transmission gates 153A and 153B which are responsive to control signals C4A and C4B, respectively. The resistors of network 152 advantageously are sized such that the gain of amplifier 151 is doubled when both switches 153 are turned on. For the specific disclosed exemplary embodiment, resistors 152C and 152D are sized to give amplifier 151 an output of 3.2 volts with four sensors 12 at maximum load. MPU 210 is programmed to generate control signals C4 if the initial weight reading is less than half range. Signal sensor 150 further comprises a switch 154 responsive to control signal T2 for connecting the output of amplifier 151 to the input of an RC filter 155 comprising resistor 156 and capacitor 157. Because of the timing relation between signals T1 and T2, the signal at the output of amplifier 151 has time (approximately 15 $\mu$sec in the exemplary embodiment) to stabilize following each energization of the sensors before being transferred by switch 154. The time constant of RC filter 155 is effectively multiplied by 200 due to the 1:200 time ratio of the timing signals T2. With capacitor 157 having a value of 0.22 mfd. and resistor 156 having a value of 5K ohms, the effective time constant of filter 155 for the disclosed embodiment is approximately 0.25 sec.

Figure 5:
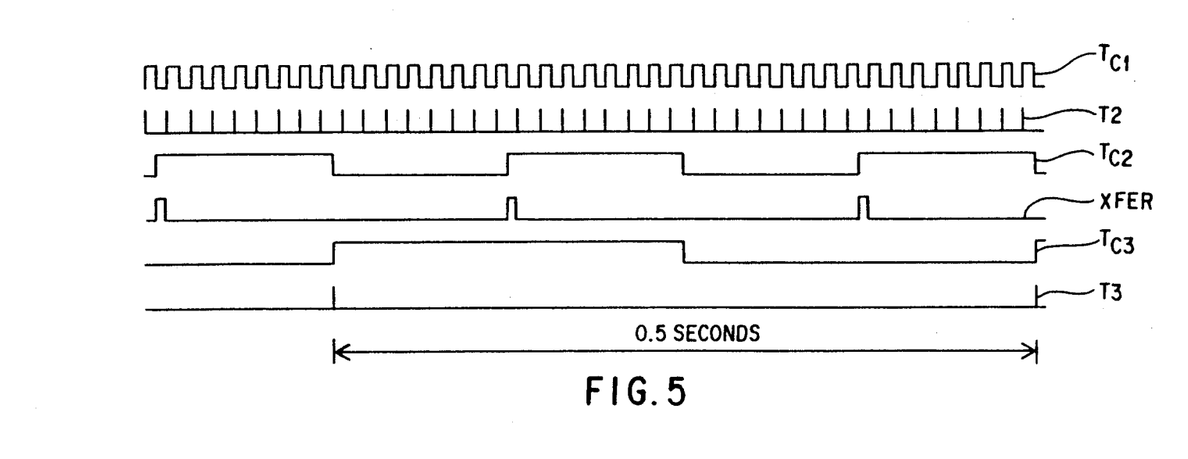
FIG. 5 is a timing diagram showing the relationship between various timing signals produced by the controller shown in FIGS. 4A–4C.

Signal sensor 150 further comprises an operational amplifier 158 for buffering the output of filter 155, a switch 159 responsive to control signal XFER for gating the output of amplifier 158 to a storage capacitor 160, and an operational amplifier 161 connected to capacitor 160 for providing a buffered output signal corresponding to the voltage on capacitor 160. The finite on-resistance of switch 159 prevents the output of amplifier 161 from being disturbed due to capacitor inrush during the transfer period when switch 159 is on. In the exemplary embodiment, as shown in the timing chart of FIG. 5, the timing relation between timing signal T2 and control signal XFER is such that, in the absence of a PERT signal from perturbation detector 180 and control signal C1 from MPU 210, the output at amplifier 158, representing a filtered weight signal, is transferred eight msec. after every 16th timing signal T2. The output of amplifier 158 constitutes the sensed weight signal sample $S_{w1}$ during the current measurement interval, and the output of amplifier 161 constitutes the sensed weight signal sample $S_{w2}$ during the previous measurement interval. When the control signal PERT is generated, further signals XFER are inhibited until control signal C1 is generated, so that the output of amplifier 161 ($S_{w2}$) remains at the last weight sample prior to detection of a perturbation until MPU 210 generates control signal C1. Control signal C1 is generated when MPU 210 is in its active signal processing mode, and after MPU 210 has obtained an initial weight reading for processing pursuant to the theft detection algorithms, i.e., the weight data WTRDG1 referred to in applicant's aforesaid copending application Ser. No. 07/467,516 incorporated herein by reference as been acquired for further processing by MPU 210 as a result of the contents of MPU counter 211 (which are produced by the then current signal FREQ from the signal $S_{w2}$) being transferred to MPU RAM 212 in response to timing signal T4.

Perturbation detector 170 comprises a differential amplifier 171 having the outputs of amplifiers 158 and 161 connected as its respective inputs, as shown. For the disclosed exemplary embodiment, biasing resistors 172–175 are selected for a gain of 500. Resistor 175 is also connected to the output of pseudo-ground generator 36. As a consequence, the output of amplifier 171 is able to swing symmetrically above and below the pseudo-ground reference voltage $V_r$. If the load on weight sensors 12 is disturbed, the current weight signal sample value $S_{w1}$ will differ from the previous stored weight signal sample value $S_{w2}$, and the output of amplifier 171 will increase or decrease in value depending on the direction (plus or minus) of the weight perturbation.

Perturbation detector 170 further comprises a variable voltage divider circuit, generally denoted 176, which is responsive to control signal $S_T$; and a coupling capacitor 180 for coupling the output of amplifier 171 to the input of voltage divider circuit 176. Coupling capacitor 180 is provided because the output of amplifier 171 will differ from reference voltage $V_r$ even when there is no weight disturbance due to offset phenomena internal to the amplifier. Voltage divider circuit 176 comprises a chain of series connected resistors 177 connected between the output of capacitor 180 and reference voltage $V_r$, and an eight channel Type 4051 analog multiplexer 178 having seven of its inputs respectively connected to the output of capacitor 180 and the junctions between the individual resistors 177, as shown. The eighth input, which is selected when all bits of signal $S_T$ are high, is left open circuit. Multiplexer 178 connects one of its inputs to its output in response to a three bit binary command input signal $S_T$ from MPU 210. Accordingly, selectable percentages, including 100%, of the weight difference signal appearing at the output of capacitor 180 can be tapped off for routing to the output of multiplexer 178 in response to input signal $S_T$. Maximum sensitivity to weight disturbance is obtained from the first multiplexer input connected directly to the output of capacitor 180. The values of resistors 177 advantageously are selected so that each lower tap in the chain reduces the sensitivity by one half. The output of multiplexer 178 is connected to the positive and negative inputs, respectively, of a pair of comparators 181 and 182, and to system ground via a storage capacitor 179. Capacitor 179 is provided so that when the output ports of MPU 210, including the ports providing multiplexer control signal $S_T$, momentarily go high during a hardware reset in response to signal WU, the output of multiplexer 178 is not disturbed. The other inputs of comparators 181 and 182 are connected to fixed symmetrical reference voltages $V_c$ and $V_c'$ above and below the pseudo ground reference voltage $V_r$ obtained from two resistive voltage dividers comprising resistors 183, 184 and 185, 186, respectively, connected between system voltage $V_{REG}$ and system ground, as shown. Comparators 181 and 182 advantageously have open collector outputs like comparators 34 and 42. A single quad amplifier such as a Type LP365 advantageously is used for all four comparators. As shown, a resistor 188 advantageously is provided to program the quad comparator for minimum power consumption. The outputs of comparators 181 and 182 are connected together to provide a single OR-configuration output which changes from high (open) to low (ground) in response to a change in the state of either comparator. Positive going weight differences, as reflected in the output of multiplexer 178, which exceed the reference voltage $V_c$ cause the output of comparator 181 to be driven low, and similar negative excursions of the output of multiplexer 178 which exceed the reference voltage $V_c'$ drive the output of comparator 182 low. Thus, control signal PERT is produced whenever a perturbation of either polarity is detected by comparator 181 or 182.

Wake-up generator 190 comprises a set-reset flip flop 191 created by cross coupling two Schmitt NAND gates 191A and 191B as shown; a rising edge triggered one shot multivibrator 192 created by capacitor 193, resistor 194 and Schmitt NAND gate 195 connected as shown; and an invertor 196 formed by resistor 197, capacitor 198 and Schmitt NAND gate 199. The control input of gate 191B is OR-connected to four different control sources. The first is a port of MPU 210 which is connected to voltage $V_{REG}$ via an internal pull-up resistor (not shown) such that the state of the control input is normally high but can be pulled low by an externally applied control signal. The second control source is the output of comparators 181 and 182, and the presence of a PERT signal (the output of comparators 181 and 182 is in a low state) causes the output of gate 191B to go high. The third control source is timing signal T3, which is generated by connecting clock signal $T_{C3}$ via coupling capacitor 189 to the control input of gate 191B. The fourth control source is an operator-actuated switch 300, which when closed couples the control input of gate 191B to ground via diode 302. Switch 300 is also connected to a port of MPU 210 for sensing the state of the switch. Capacitor 189 is sized to cause a negative going pulse to be applied at the control input to gate 191B in response to a timing signal T3 which is shorter in duration than the pulse produced by one-shot multivibrator 192.

The control input of gate 191A is connected to a control signal C5 from MPU 210 which is maintained in a high state during the power-down mode of MPU 210. When the output of gate 191B goes high in response to a PERT signal, the negative going edge of timing signal T3, or the closure of switch 300, and the MPU control signal C5 also is in a high state, the output of gate 191A goes low. The output of gate 191A is connected to one of the inputs of clock gate 132A, and a low state of the gate 191A output inhibits the generation of control signals XFER until flip-flop 191 is reset. Assuming voltage $V_{REG}$ is present at the other input to gate 195, when the output of flip-flop gate 191B switches high in response to one of the control inputs, invertor 196 generates wake-up signal WU. Signal WU will also be generated at initial power on (when battery B1 is connected to the controller) due to capacitor 198 holding the other input of gate 199 low until it is charged through resistor 197.

Turning to signal analysis section 200, A/D signal converter 220 advantageously comprises a voltage-to-frequency (V/F) converter 221, such as an Analog Devices AD654, for converting the voltage output of amplifier 161 to a frequency signal FREQ. The conversion factor of V/F converter 221 is set by resistor 222 and capacitor 223. In the case of the disclosed exemplary embodiment, resistor 222 and capacitor 223 advantageously are selected to convert a 0 to 1 volt input to a proportional 0 to 256 KHz output. A voltage divider comprising resistors 224 and 225 is provided to scale the output of amplifier 161 to the input range of V/F converter 221. An output resistor 226 for producing output signal FREQ is connected as shown between the system voltage $V_{REG}$ and the converter output because the Analog Devices converter used in the disclosed embodiment has an open collector output. Output signal FREQ is connected to a port of MPU 210 which is program configured as an input to MPU internal counter 211.

Switch 230 advantageously is similar to switch 135 and comprises a switching transistor 232 connected between voltage $V_{REG}$ and V/F converter 221, and a bias resistor 234 connecting control signal C2 to the input of transistor 232.

Turning to the operation of MPU 210, as discussed hereinabove, there are three circumstances which cause the input to flip-flop gate 191B to become a low voltage, and thus cause control signal WU to be generated, when MPU 210 is in its power down mode. One circumstance is the generation of control signal PERT in response to the detection of either a positive or negative perturbation by comparators 181 and 182. Another circumstance is the occurrence of timing signal T3. The third is the closure of switch 300. MPU 210 is programmed not to generate a reset control signal C5 until just prior to entry into the shut down mode. Consequently, the occurrence of any of the foregoing circumstances during normal operation of MPU 210 does not cause the generation of reset signal WU. However, a reset signal WU is always generated on initial power up when battery B1 is first connected to the controller.

MPU 210 is programmed to determine, following reset in response to a reset signal WU, what event caused the reset to occur. Referring to the flow chart of FIG. 6, as soon as reset has occurred, MPU 210 first checks (step 400) whether the output of comparator 42 is low. If so, then reset is presumed to have been caused by an initial power up (battery connection), and MPU 210 performs the initialization routine (step 402), followed by the programmed weight measurement and theft detection routines (step 404) described in applicant's aforesaid copending application incorporated by reference, so long as weight perturbations are detected. It will be appreciated that as part of the initialization routine, MPU 210 loads the threshold and alarm criteria values stored in memory device 250 as a result of the last performance of the calibration routine programmed in MPU 210. When weight changes are not detected (step 406), control signal C5 is generated to reset wake-up flip flop 191, and MPU 210 enters the power down mode (step 407).

Figure 6:
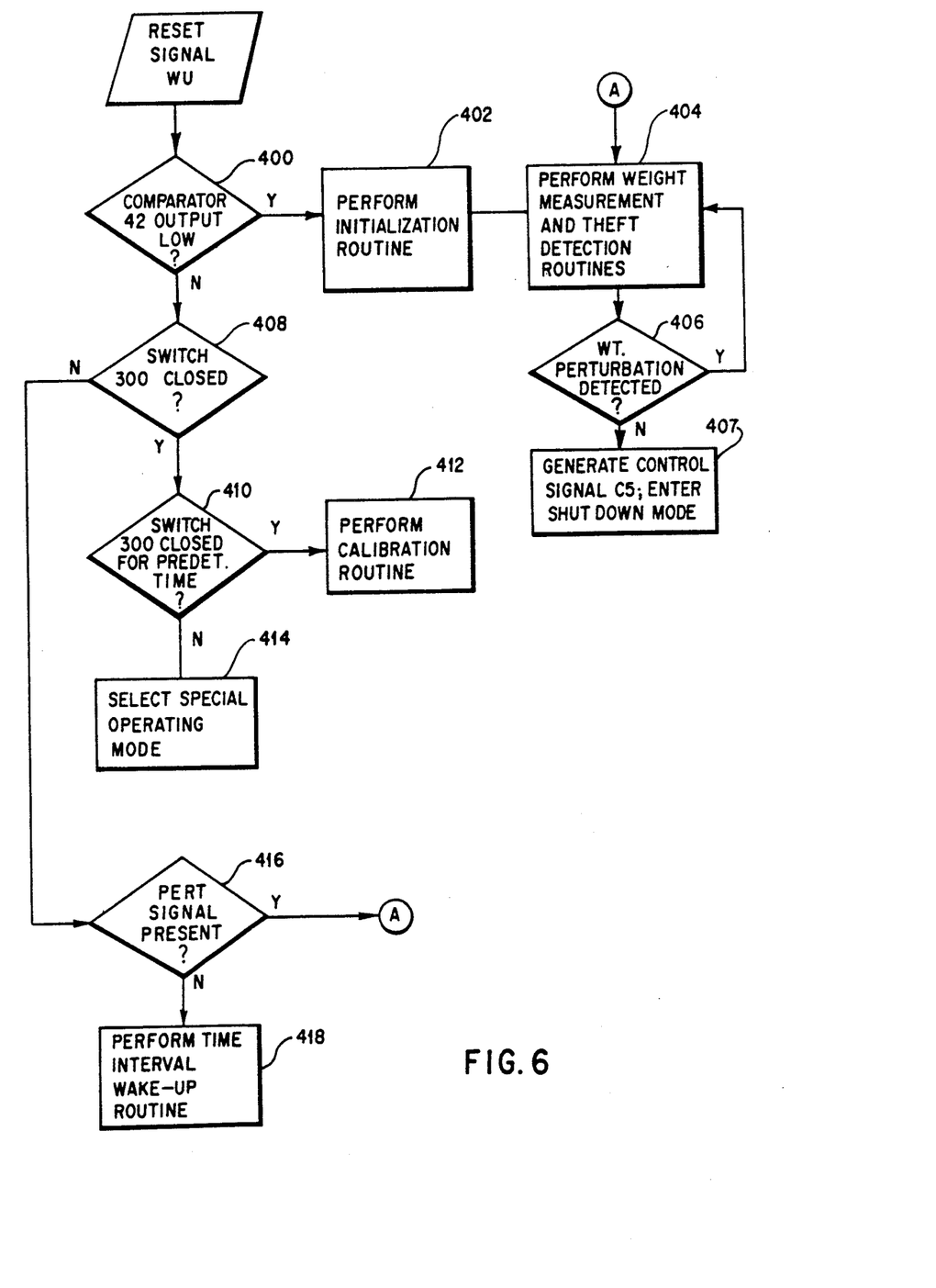
FIG. 6 is a flow chart of the overall operation of a processor incorporated in the controller shown if FIGS. 2 and 4A–4C.

If the determination at step 400 is negative (the output of comparator 42 is not low), then the state of switch 300 is sensed (step 408) by determining whether the port connected to the switch is low. If so, then reset is presumed to have been caused by closure of switch 300, and state of switch 300 continues to be sensed (step 410) to determine whether the switch is maintained in a closed state for a predetermined time period. If so, MPU then executes the calibration routine (step 412) described in applicant's aforesaid copending application incorporated herein by reference. If the determination is that switch 300 has been closed for less than the predetermined time period, then MPU 210 permits (step 414) selection by the operator of one or more predetermined special operating modes, such as, for example, alarm inhibit for a predetermined period of time, as described in applicant's aforesaid copending application incorporated herein by reference.

If the initial determination at step 408 is that switch 300 is not closed, then the MPU port connected to the control input to gate 191B is checked (step 416) to determine the presence of control signal PERT. If present (the port is low), then reset is presumed to have been caused by a weight perturbation, and MPU 210 performs the programmed weight measurement and theft detection routines (step 404) as in the case of initial power up until weight perturbations are no longer detected.

If the determination at step 416 is that control signal PERT is not present, then reset is presumed to have been caused by timing signal T3, and MPU 210 then executes a time interval wake-up routine (step 418) to be described hereinafter.

When MPU 210 is awakened from the power down mode due to either initial power up or detection of a weight perturbation, MPU 210 generates control signal C2 to energize A/D converter 220 to generate signal FREQ. When the wake-up is due to initial power up, control signal C1 is immediately generated to obtain current weight readings. Weight readings continue to be taken until no weight perturbations are taken, whereupon control signal C5 is generated and MPU 210 enters the power down mode. In the case of a perturbation detection induced wake-up, the setting of wake-up flip-flop 191 inhibits generation of the signal XFER, and the initial signal FREQ thus represents the stored weight value ($S_{w2}$) prior to the perturbation. Thereafter, MPU 210 generates control signal C1, which causes signal XFER to be continuously generated. This results in the weight signal $S_{w2}$ being equal to weight signal $S_{w1}$, that is, the current weight sample. Thus, following a perturbation wake-up, MPU 210 will initially compare the last stable weight reading obtained prior to detection of the wake-up perturbation with the first weight reading obtained following wake-up. Thereafter, successive current weight readings will be analyzed in accordance with the programmed theft detection routines until perturbations are no longer detected. Advantageously, MPU 210 is programmed to enter its idle mode for reduced power consumption each time the previous weight reading has been processed until the next weight reading has been converted to weight data. This is possible because counter 212 and the interrupt input controlling transfer of the counter contents to RAM 213 and resetting of counter 212 continue to function during the idle mode.

Timing signal T3 causes wake-up of MPU 210 from the power down mode every half second in the absence of any weight perturbations in order to permit timing of the long time periods used in the theft detection routines with minimum power consumption. In response to a time interval wake-up caused by timing signal T3, MPU 210 is programmed to increment a software counter and check whether the software counter has reached a predetermined limit value. If the limit has not been reached, then MPU 210 generates control signal C5 to reset wake-up flip-flop 191, and then reenters the power down mode. If the limit has been reached, MPU 210 will take the action determined by the theft detection routines, and then reset flip-flop 191 and reenter the power down mode.

In the calibration mode, as disclosed in the aforesaid copending application incorporated herein by reference, the weight sensors are assumed to be more than half loaded. Accordingly, MPU 210 is programmed to initially obtain weight readings at the lowest gain of variable gain amplifier 151, that is without resistors 152A and 152B connected to ground via gates 153A and 153B. MPU 210 then checks to determine whether the initial weight readings are less than half range, and if so, one or both of control signals C4A and C4B are generated as appropriate to increase the gain of amplifier 151 to raise the weight readings to over half range. Threshold and alarm criteria data are normally written to storage device 250 at the successful completion of the calibration mode. This data is read by MPU 210 as part of the initialization routine following the initial processor reset which occurs when a battery is connected.

Referring to FIG. 4C, acknowledgement and alarm signal generator 240 advantageously comprises a conventional speech synthesizer 241, such as a NEC Type 77P56, for producing analog output signals representing selected stored messages in response to control signals C3 from MPU 210, a low pass active filter 242 and audio amplifier 243 for filtering and amplifying the output of synthesizer 241, and a speaker 244 for generating audio messages in response to the output of amplifier 243. The reset input of synthesizer 241 is connected to the output of power supply capacitor 40 so that the synthesizer is reset upon initial power up when battery B1 is connected to controller 20. Advantageously, synthesizer 241 generates an output signal $S_A$ indicating that it is active. Signal $S_A$ is connected to MPU 210 so that MPU 210 can determine when generation of a message has been completed. In order to reduce power consumption, system voltage $V_{REG}$ is supplied to filter 242 and amplifier 243 via a transistor switch 245 which is controlled by signal $S_A$ so that the filter and amplifier circuits are switched on only when an audio output is to be generated.

A controller constructed in accordance with the present invention has a very low power consumption. With MPU 210 in the power down mode, the exemplary disclosed embodiment of controller 20 has a current drain of less than 250 $\mu$amps. The controller of the present invention is also very economical to manufacture, yet provides the high resolution necessary for a weight based monitoring system. It will be appreciated that the various circuit components shown as discrete elements can be implemented as single LSI integrated circuit chips. For example, the digital logic used to generate the various timing signals can be replaced with a single ASIC digital gate array chip. It will be further appreciated by those skilled in the art that the disclosed preferred embodiment is otherwise only exemplary, and that numerous modifications can be made without departing from the scope or spirit of the invention.

I claim:

1. A low power consumption controller for weight based article input and removal monitoring apparatus, the monitoring apparatus comprising an article supporting rack, at least one sensor for sensing the weight of the rack and producing an output signal indicative of the sensed weight, and a power supply for energizing the at least one sensor; said controller comprising:

continuously active weight monitoring means responsive to the output of the at least one sensor for producing a first control signal in response to predetermined changes in the sensed weight; and signal analysis means switchable from an inactive mode to an active mode in response to said first control signal for analyzing the output of the at least one sensor, and for controlling the operation of said weight monitoring means;

said weight monitoring means comprising:

timing means for generating first and second timing signals in a predetermined timed relation to each other independent of control by said signal analysis means and a third timing signal in predetermined timed relation to said first and second timing signals under the control of said signal analysis means;

switch means responsive to said first timing signal for controlling connection of the power supply to the at least one sensor to provide intermittent operation of the at least one sensor;

signal sensing means responsive to said second and third timing signals for producing successive weight sample signals from the output of the at least one sensor;

signal comparing means responsive to said weight sample signals and to a threshold signal produced by said signal analysis means for producing said first control signal.

2. The controller of claim 1 wherein:

said signal sensing means comprises first weight sample signal producing means connected to the output of the at least one sensor by first gate means controlled by said second timing signal, and second weight sample signal producing means connected to the output of said first signal producing means by second gate means controlled by said third timing signal; and said timing means comprises:

clock means for generating said first and second timing signals and a fourth timing signal;

logic means responsive to said fourth timing signal, said first control signal and a second control signal generated by said signal analysis means for generating said third timing signal such that said fourth timing signal constitutes said third timing signal in the absence of said first and second control signals, generation of said third timing signal is inhibited when said first control signal is present and said second control signal is not present, and said second control signal constitutes said third timing signal when said second control signal is generated.

3. The controller of claim 1 wherein said signal analysis means is responsive to said fourth timing signal such that the operation of said signal analysis means is synchronized with the operation of said weight monitoring means.

4. The controller of claim 1 wherein:
said signal sensing means comprises:
first signal producing means connected to the output of the at least one sensor by first gate means controlled by said second timing signal; and
second signal producing means connected to the output of said first signal producing means by second gate means controlled by said third timing signal; and
said signal comparing means comprises:
reference voltage generating means for generating a pseudo ground reference voltage; first comparator means biased by said pseudo ground reference voltage for comparing said first and second signals and producing an output indicative of the difference between said first and second signals relative to said pseudo ground reference voltage; and
second and third comparator means for respectively comparing said first comparator means output with predetermined second and third reference voltages above and below said pseudo ground reference voltage and for producing said first control signal if said first comparator means output is greater than said first reference voltage or less than said second reference voltage.

5. The controller of claim 4 wherein said signal comparing means further comprises a voltage divider means comprising resistive means connected between said first comparator means output and said pseudo ground reference voltage, and multiplexer means responsive to said threshold signal for tapping a signal from a selected portion of said resistive means and connecting said tapped signal to said first and second comparator means.

6. The controller of claim 5 wherein said resistive means comprises a plurality of series connected resistors having connections at the junctions between successive resistors to respective inputs of said multiplexer means.

7. The controller of claim 5 further comprising capacitive means for coupling said first comparator means output to said resistive means.

8. The controller of claim 1 wherein the output of the at least one sensor is an analog signal, said signal sensing means produces analog weight sample signals, and said signal comparing means comprises analog means for comparing said weight sample signals and producing said first control signal; and wherein said signal analysis means comprises digital signal processing means and converter means activated by said digital processing means in response to said first control signal for converting to a digital weight data signal the output of said second weight sample signal producing means which is produced in response to said second control signal.

* * * * *